United States Patent
Shen et al.

(10) Patent No.: US 9,215,111 B2
(45) Date of Patent: Dec. 15, 2015

(54) TRANSMISSION CIRCUIT FOR I/O INTERFACE AND SIGNAL TRANSMISSION METHOD THEREOF

(71) Applicant: VIA Technologies, Inc., New Taipei (TW)

(72) Inventors: Hung-Hao Shen, New Taipei (TW); Wei-Yu Wang, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 158 days.

(21) Appl. No.: 14/020,903

(22) Filed: Sep. 9, 2013

(65) Prior Publication Data
US 2014/0086297 A1    Mar. 27, 2014

(30) Foreign Application Priority Data
Sep. 26, 2012   (TW) .............................. 101135362 A

(51) Int. Cl.
*H03K 5/159* (2006.01)
*H04L 25/03* (2006.01)

(52) U.S. Cl.
CPC .... *H04L 25/03878* (2013.01); *H04L 25/03885* (2013.01)

(58) Field of Classification Search
CPC .................... H04L 25/03057; H04L 25/03038
USPC .................................. 375/229, 333; 708/323
See application file for complete search history.

(56) References Cited

U.S. PATENT DOCUMENTS

| | | | | |
|---|---|---|---|---|
| 6,505,222 | B1 * | 1/2003 | Davis et al. | 708/323 |
| 2007/0058709 | A1 | 3/2007 | Chen et al. | |
| 2007/0133672 | A1 * | 6/2007 | Lee et al. | 375/233 |
| 2008/0291335 | A1 * | 11/2008 | Markman | 348/725 |

FOREIGN PATENT DOCUMENTS

| | | |
|---|---|---|
| CN | 1294790 | 5/2001 |
| TW | 200843382 | 11/2008 |
| TW | 201210271 | 3/2012 |

OTHER PUBLICATIONS

"Office Action of China Counterpart Application", issued on Nov. 18, 2014, p. 1-p. 14, in which the listed references were cited.
"Office Action of Taiwan Counterpart Application", issued on Jul. 15, 2014, p. 1-p. 13, in which the listed references were cited.

* cited by examiner

*Primary Examiner* — Daniel Washburn
*Assistant Examiner* — Fitwi Hailegiorgis
(74) *Attorney, Agent, or Firm* — Jianq Chyun IP Office

(57) ABSTRACT

A transmission circuit including an equalizer circuit, a slicer circuit, a signal detection circuit, and a control circuit is provided. The equalizer circuit performs an equalizing operation on an input signal according to preset states to output an equalizing signal corresponding to each preset state. The slicer circuit performs a slicing operation on the equalizing signal to output a slicing signal. The signal detection circuit detects and compares the equalizing signal and the slicing signal and accordingly adjusts the equalizer circuit to one of the preset states. The control circuit receives the slicing signal corresponding to each preset state, compares the slicing signal corresponding to each preset state with a plurality of signal patterns to generate a comparison result, and selects one of the preset states according to the comparison result, such that the control circuit let the equalizer circuit perform the equalizing operation according to the selected preset state.

21 Claims, 7 Drawing Sheets

TRANSMISSION CIRCUIT FOR I/O INTERFACE AND SIGNAL TRANSMISSION METHOD THEREOF

CROSS-REFERENCE TO RELATED APPLICATION

This application claims the priority benefits of Taiwan application serial no. 101135362, filed on Sep. 26, 2012. The entirety of the above-mentioned patent applications is hereby incorporated by reference herein and made a part of this specification.

BACKGROUND OF THE INVENTION

1. Field of the Invention

The invention relates to an electronic circuit and a signal processing method thereof and particularly relates to a transmission circuit adapted for an input and output (I/O) interface and a signal transmission method thereof.

2. Description of Related Art

Generally speaking, a link needs to be established between two electronic devices according to the standard of the transmission interfaces thereof in order to perform signal transmission between the two electronic devices. Once the link is successfully established, signal transmission between the electronic devices can be carried out. Nevertheless, when signals are transmitted at high speed, the signal strength may be improperly deteriorated due to a low-quality transmission channel between the electronic devices. In that case, the bit error ratio may be raised due to the deteriorated signal strength or the increased noise jitter, which affects communication quality. Thus, the quality of the transmission channel may significantly affect the communication quality between electronic devices.

According to the conventional technology, an equalizer circuit is often disposed in the transmission circuit for the I/O interface of the electronic devices for equalizing the received input signals. However, conventional equalizer circuit usually performs the equalizing operation with fixed preset parameters. That is to say, regardless of the quality of the transmission channel, the parameters preset in the equalizer circuit cannot be adjusted according to different transmission channel characteristics. As a consequence, in the application of some transmission interface standards, the equalizer circuit may not cooperate with low-quality transmission channels and may provide incorrect signals to back-end circuits and cause erroneous decoding. For the above reasons, how to adjust the equalizing operation parameters of the equalizer circuit according to transmission channels with different qualities has become an important issue.

SUMMARY OF THE INVENTION

The invention provides a transmission circuit adapted for an I/O interface, which has favorable signal transmission quality.

The invention provides a signal transmission method, which provides favorable signal transmission quality.

The invention provides a transmission circuit adapted for an I/O interface, and the transmission circuit includes an equalizer circuit, a slicer circuit, a signal detection circuit, and a control circuit. The equalizer circuit receives an input signal and performs an equalizing operation on the input signal according to a plurality of preset states to output an equalizing signal corresponding to each preset state. The slicer circuit is coupled to the equalizer circuit for receiving the equalizing signal and performing a slicing operation on the equalizing signal to output a slicing signal. The signal detection circuit is coupled to the slicer circuit for detecting and comparing the equalizing signal and the slicing signal to adjust the equalizer circuit to one of the preset states. The control circuit is coupled to the slicer circuit for receiving the slicing signal corresponding to each preset state. The control circuit compares the slicing signal corresponding to each preset state with a plurality of signal patterns to generate a comparison result, and selects one of the preset states according to the comparison result, such that the control circuit let the equalizer circuit perform the equalizing operation according to the selected preset state.

The invention provides a signal transmission method adapted for a transmission circuit of an I/O interface. The signal transmission method includes the following. An input signal is received and an equalizing operation is performed on the input signal according to a plurality of preset states to output an equalizing signal corresponding to each preset state. A slicing operation is performed on the equalizing signal to output a slicing signal. The equalizing signal and the slicing signal are detected and compared to set the transmission circuit to one of the preset states. The slicing signal corresponding to each preset state is compared with a plurality of signal patterns to generate a comparison result and one of the preset states is selected according to the comparison result to let the transmission circuit perform the equalizing operation according to the selected preset state.

The invention provides a transmission circuit adapted for an I/O interface, which establishes a communication link with a host via a transmission channel. The transmission circuit includes an analog circuit block and a digital circuit block. The analog circuit block receives an input signal and performs an equalizing operation on the input signal according to a plurality of preset states to output an equalizing signal corresponding to each preset state. Moreover, the analog circuit block performs a slicing operation on the equalizing signal to output a slicing signal. The digital circuit block is coupled to the analog circuit block for receiving the slicing signal corresponding to each preset state. The digital circuit block compares the slicing signal corresponding to each preset state with a plurality of signal patterns to generate a comparison result. In addition, the digital circuit block selects one of the preset states according to the comparison result to let the analog circuit block perform the equalizing operation according to the selected preset state.

Based on the above, in the exemplary embodiments of the invention, the control circuit sets the preset state for the equalizer circuit to perform the equalizing operation according to the comparison result of the slicing signal and the signal patterns. Thus, the transmission circuit of the invention selects different preset states for performing the equalizing operation according to the different qualities of the transmission channels. Accordingly, favorable signal transmission quality is achieved even when the signal transmission is performed in transmission channels of different qualities.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
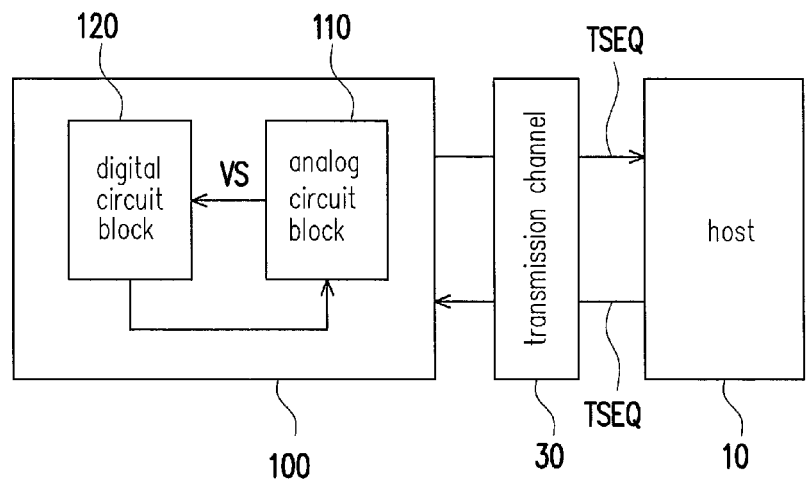
FIG. 1 is a block diagram illustrating a transmission circuit of a device according to an embodiment of the invention.

Generally speaking, in order to perform signal transmission between two electronic devices, a communication link needs to be established between the electronic devices according to a standard of the transmission interfaces thereof. After the link is successfully established, signal transmission can be performed between the two electronic devices. At present, the standards for transmission interfaces that may serve as an I/O interface include: Serial Advanced Technology Attachment (SATA) standard, Institute of Electrical and Electronic Engineers (IEEE) 1394 standard, Peripheral Component Interconnect Express (PCI Express) standard, Universal Serial Bus (USB) standard, Secure Digital (SD) interface standard, Memory Stick (MS) interface standard, Multi Media Card (MMC) interface standard, Compact Flash (CF) interface standard, Integrated Device Electronics (IDE) standard, or other suitable standards.

In the following paragraphs, the Universal Serial Bus 3.0 (USB 3.0) standard is taken as an example for illustrating the disclosure, and the two electronic devices are a host and a device, for example. Before the host is electrically connected with the device via an appropriate transmission channel, a link state between the host and the device is in a super speed inactive state as defined by the USB 3.0 standard. After the host is electrically connected with the device via the appropriate transmission channel, the link state between the host and the device is in an Rx.Detect state wherein the host detects whether a signal is input. If an input signal is detected, the host executes a polling procedure to establish the communication link with the device. Next, if the polling procedure between the host and the device is properly executed and the polling is correct, the link state between the host and the device enters a normal operational state. Accordingly, the communication link between the host and the device is successfully established, which allows the host and the device to perform signal transmission in the normal operational state.

In the polling procedure, a plurality of polling steps need to be executed between the host and the device to ensure that the polling procedure is correct. First, the host transmits a low frequency period signal (LFPS) to the device. In response, the device transmits a corresponding low frequency period signal to the host after receiving the low frequency period signal from the host, so as to complete a signal handshake. After the signal handshake is completed, the polling procedure enters an RxEQ step. In this step, the host transmits TSEQ ordered sets to the device. Likewise, the device needs to transmit corresponding TSEQ ordered sets to the host after receiving the TSEQ ordered sets from the host, so as to confirm the completion of this step and carry out other sequential polling steps. Thus, if the polling procedure between the host and the device is properly executed and the polling is correct, the link state between the host and the device enters the normal operational state.

After the TSEQ ordered sets, which serve as the input signal, are input to a transmission circuit of the device, the transmission circuit performs equalizing, slicing, and analog-to-digital conversion operations on the TSEQ ordered sets. Then, the transmission circuit outputs the processed TSEQ ordered sets to a circuit of a next stage. Therefore, in the polling procedure, an algorithm for the transmission circuit to perform the equalizing operation on the TSEQ ordered sets is very important to the correctness of the polling procedure. In view of the above, how to provide a better algorithm is an important issue that the designer needs to consider. In the exemplary embodiment of the invention, the polling procedure defined by the USB 3.0 standard is applied to the transmission circuit, for example, but the invention is not restricted thereto. A better algorithm may be used to perform the equalizing operation on an input test signal to achieve better signal transmission quality. Accordingly, the signal transmission between the host and the device can be performed by using a low-quality transmission channel (e.g. a transmission line). For better understanding of the invention, at least one exemplary embodiments of the invention are explained below with reference to the figures.

FIG. 1 is a block diagram illustrating a transmission circuit of a device according to an embodiment of the invention. Referring to FIG. 1, in this embodiment, a transmission circuit 100 and a host 10 are electrically connected via an appropriate transmission channel 30. In an equalizing test step of the aforementioned polling procedure, the host 10 and the transmission circuit 100 transmit TSEQ ordered sets to each other. The transmission circuit 100 of this embodiment are approximately divided into two circuit blocks, namely an analog circuit block 110 and a digital circuit block 120. After the TSEQ ordered set, which serves as the input signal, is input to the transmission circuit 100, the analog circuit block 110 performs equalizing and slicing operations, etc., on the TSEQ ordered set. Then, the analog circuit block 110 outputs a slicing signal VS corresponding to the TSEQ ordered set to the digital circuit block 120. In this embodiment, the analog circuit block 110 performs the equalizing operation on the TSEQ ordered set, which serves as the input signal, according to one of a plurality of preset states. In an embodiment, the analog circuit block 110 performs equalizing operations on the TSEQ ordered set with different equalizing operation parameters in different preset states. In an embodiment, the different equalizing operation parameters correspond to transmission channels 30 of different qualities. By using the different equalizing operation parameters, the analog circuit block 110 performs the equalizing operations of different degrees corresponding to the different qualities of the transmission channels 30, so as to provide a correct signal to a back-end circuit.

In this embodiment, the digital circuit block 120 compares the slicing signal VS with a plurality of signal patterns that are stored in advance in a register circuit therein after receiving the slicing signal VS corresponding to the TSEQ ordered set. In an embodiment that the transmission circuit is disposed in a USB 3.0 device, the TSEQ ordered set is a set of modulated signal sequence defined by the USB 3.0 standard, and the sequence has a plurality of specific signal patterns. The digital circuit block 120 of this embodiment may store ideal signal patterns of this modulated signal sequence in advance. The digital circuit block 120 compares the slicing signal VS with the stored signal patterns after receiving the slicing signal VS corresponding to the TSEQ ordered set, so as to obtain a matching degree of the slicing signal VS and the signal patterns. Next, the digital circuit blocks 120 sets the analog circuit block 110 according to another set of parameter information, and the analog circuit block 110 performs the equalizing operation on the TSEQ ordered set with another preset state. Then the analog circuit block 110 outputs the slicing signal VS corresponding to the TSEQ ordered set to the digital circuit block 120 again. The digital circuit block 120 again compares the received slicing signal VS with the signal patterns to obtain the matching degree of the slicing signal VS and the corresponding signal patterns in the current preset state. The digital circuit block 120 selects one preset state to set the analog circuit block 110 for the analog circuit block 110 to perform the equalizing operation on the input signal in the selected preset state. The selected preset state has the highest matching degree among the preset states according to the matching degrees of the slicing signal VS and the corresponding signal patterns in different preset states. In a word, the digital circuit block 120 enables the analog circuit block 110 to perform the equalizing operations on the TSEQ ordered set in different preset states. The digital circuit block 120 compares the signal patterns (i.e. the ideal signal patterns corresponding to the modulated signal sequence defined by the USB 3.0 standard) with the slicing signal VS in each preset state to obtain a comparison result. According to the comparison result, the preset state that has the highest matching degree is selected to set the analog circuit block 110. The transmission circuit 100 of this embodiment enables the analog circuit block 110 to perform the equalizing operation with the most appropriate equalizing operation parameters according to the different qualities of the transmission channel 30, so as to provide favorable signal transmission quality. Moreover, the digital circuit block 120 of this embodiment further converts the slicing signal VS which belongs to a series type to a digital signal which belongs to a deseries type and provides the same to the circuit of the next stage.

In this embodiment, the TSEQ ordered set TSEQ outputted by the host 10 is transmitted and input to the device via the appropriate transmission channel 30. A receiving end of the device is a type of the transmission circuit 100 of this embodiment. Below provided is an embodiment illustrating how to compare the slicing signal with the preset signal patterns and how to set an equalizer circuit based on the comparison result.

Figure 2:
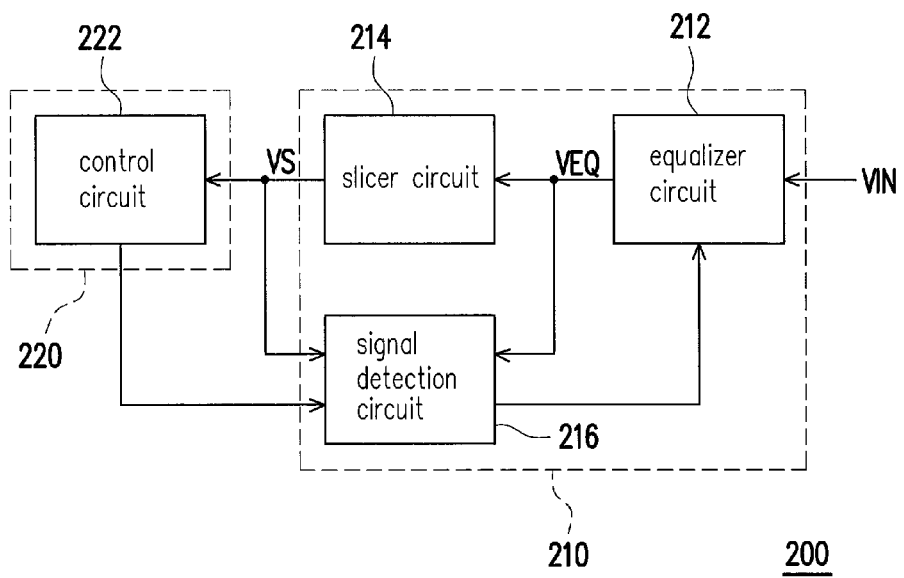
FIG. 2 is a block diagram illustrating a transmission circuit according to another embodiment of the invention.

FIG. 2 is a block diagram illustrating a transmission circuit according to another embodiment of the invention. Referring to FIG. 2, a transmission circuit 200 of this embodiment includes an equalizer circuit 212, a slicer circuit 214, a signal detection circuit 216, and a control circuit 222. The equalizer circuit 212 receives an input signal VIN, which for example includes a TSEQ ordered set for establishing a link in the polling procedure. The equalizer circuit 212 performs an equalizing operation on the input signal VIN according to a plurality of preset states to output an equalizing signal VEQ corresponding to each of the preset states to the slicer circuit 214 and the signal detection circuit 216. In an embodiment, the preset states mean that the signal detection circuit 216 adjusts equalizing operation parameters of the equalizer circuit 212 with different configurations of parameter information for the adjusted equalizer circuit 212 to perform the equalizing operation on the TSEQ ordered set. In an embodiment, the parameter information corresponding to the preset state is a DC bias in the signal detection circuit 216. The equalizing operation parameters of the equalizer circuit 212 include a swing and a gain. In other words, the equalizer circuit 212 are adjusted to have different swings or gains in different preset states, so as to perform the equalizing operation on the input signal VIN.

In this embodiment, the slicer circuit 214 is coupled to the equalizer circuit 212 for receiving the equalizing signal VEQ and performing a slicing operation on the equalizing signal VEQ and accordingly outputs a slicing signal VS to the control circuit 222 and the signal detection circuit 216. The signal detection circuit 216 is coupled to two ends of the slicer circuit 214 for detecting and comparing the equalizing signal VEQ input to the slicer circuit 214 and the slicing signal VS output to the control circuit 222, thereby adjusting the equalizer circuit 212 according to one of the preset states. In an embodiment, the signal detection circuit 216 detects signal powers of the equalizing signal VEQ and the slicing signal VS, for example, but the invention is not restricted thereto. In other embodiments, the signal detection circuit 216 may detect other signal characteristics of the equalizing signal VEQ and the slicing signal VS.

In this embodiment, the control circuit 222 is coupled to the slicer circuit 214 for comparing the slicing signal VS and the signal patterns and selects one of the preset states to adjust the equalizer circuit 212 according to the comparison result. In this embodiment, the control circuit 222 adjusts the equalizer circuit 212 to one of the preset states via the signal detection circuit 216 for performing the equalizing operation; however, it is noted that the invention is not restricted thereto. In another embodiment, the control circuit 222 may directly set the equalizer circuit 212 without the signal detection circuit 216.

From the aspect of circuit blocks, the transmission circuit 200 of this embodiment are approximately divided into two circuit blocks, namely an analog circuit block 210 and a digital circuit block 220. According to this embodiment, the analog circuit block 210 includes the equalizer circuit 212, the slicer circuit 214, and the signal detection circuit 216, and the digital circuit block 220 includes a control circuit 222.

Simply put, in the RxEQ step of the polling procedure, the control circuit 222 of this embodiment sets the equalizer circuit 212 perform the equalizing operation according to different preset states. Moreover, the control circuit 222 compares the slicing signal VS and the signal patterns, so as to select the preset state that has the highest matching degree as the setting for the analog circuit block 210 to perform the equalizing operation. An index for evaluating the matching degree of the slicing signal VS and the signal patterns is a bit error rate (BER), for example. Given that the equalizer circuit 212 performs the equalizing operation for the same period of time in each of the preset states in the RxEQ step of the polling procedure, a low bit error rate indicates that the matching degree is high. By contrast, a high bit error rate indicates that the matching degree is low. The control circuit 222 selects the preset state that has the lowest bit error rate as the setting for the analog circuit block 210 to perform the equalizing operation. Another index for evaluating the matching degree of the slicing signal VS and the signal patterns is a correct rate, for example, and the control circuit 222 selects the preset state that has the highest correct rate as the setting for the analog circuit block 210 to perform the equalizing operation.

Figure 3:
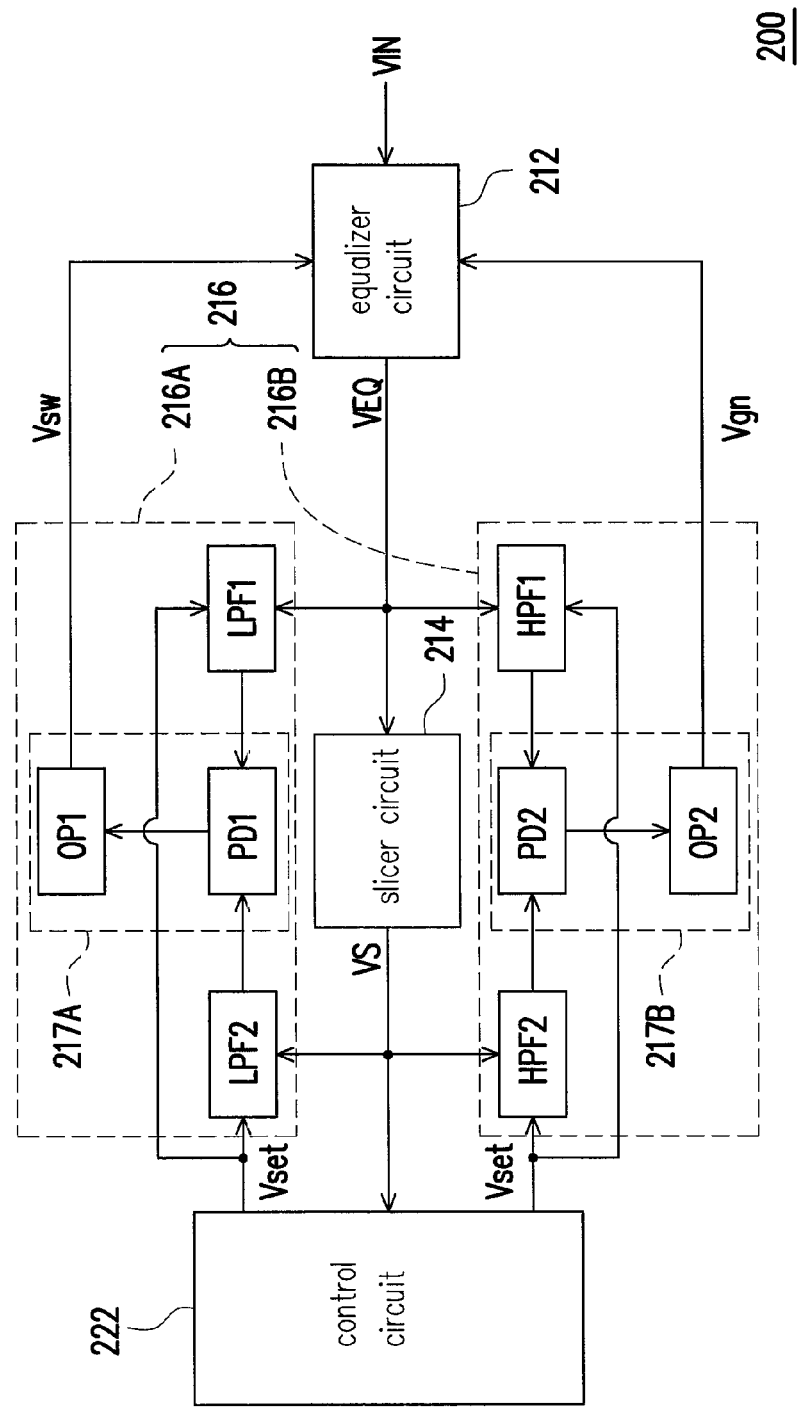
FIG. 3 is a detailed block diagram illustrating a signal detection circuit in the transmission circuit of FIG. 2.

FIG. 3 is a detailed block diagram illustrating a signal detection circuit in the transmission circuit of FIG. 2. Referring to FIG. 3, the signal detection circuit 216 of this embodiment includes a first detection circuit 216A and a second detection circuit 216B. The first detection circuit 216A is coupled to the slicer circuit 214 for detecting and comparing low frequency component of the equalizing signal VEQ and low frequency component of the slicing signal VS and accordingly outputs a swing adjustment signal Vsw to the equalizer circuit 212 to adjust the swing of the equalizer circuit 212. The second detection circuit 216B is coupled to the slicer circuit 214 for detecting and comparing high frequency component of the equalizing signal VEQ and high frequency component of the slicing signal VS and accordingly outputs a gain adjustment signal Vgn to the equalizer circuit 212 to adjust the gain of the equalizer circuit 212.

In the above embodiment, the swing of the equalizer circuit 212 is adjusted through the low frequency components of the equalizing signal VEQ and the slicing signal VS, and the gain of the equalizer circuit 212 is adjusted through the high frequency components of the equalizing signal VEQ and the slicing signal VS. Nevertheless, the invention is not limited thereto. In another embodiment, the swing of the equalizer circuit 212 may be adjusted through the high frequency components of the equalizing signal VEQ and the slicing signal VS, and the gain of the equalizer circuit 212 may be adjusted through the low frequency components of the equalizing signal VEQ and the slicing signal VS. In addition, the first detection circuit 216A and the second detection circuit 216B respectively detect signal powers of the low frequency components and high frequency components of the equalizing signal VEQ and the slicing signal VS, for example, but the invention is not restricted thereto. In other embodiments, the first detection circuit 216A and the second detection circuit 216B may detect other signal characteristics of the equalizing signal VEQ and the slicing signal VS.

More specifically, in this embodiment, the first detection circuit 216A includes a first low-pass filter circuit LPF1, a second low-pass filter circuit LPF2, and a first power amplifier circuit 217A. The first low-pass filter circuit LPF1 is coupled to the slicer circuit 214 and the equalizer circuit 212 for detecting the equalizing signal VEQ and outputs the low frequency component of the equalizing signal VEQ to the first power amplifier circuit 217A. The second low-pass filter circuit LPF2 is coupled to the slicer circuit 214 and the control circuit 222 for detecting the slicing signal VS and outputs the low frequency component of the slicing signal VS to the first power amplifier circuit 217A. The first power amplifier circuit 217A is coupled to the first low-pass filter circuit LPF1, the second low-pass filter circuit LPF2, and the equalizer circuit 212. The first power amplifier circuit 217A is used for comparing the low frequency components of the equalizing signal VEQ and the slicing signal VS and accordingly outputs the swing adjustment signal Vsw to adjust the swing of the equalizer circuit 212. The control circuit 222 is coupled to the first low-pass filter circuit LPF1 and the second low-pass filter circuit LPF2 and sends a setting signal Vset according to one preset state to set the DC bias in the first low-pass filter circuit LPF1 and the second low-pass filter circuit LPF2, so as to adjust outputs of the first low-pass filter circuit LPF1 and the second low-pass filter circuit LPF2.

In an embodiment, the first power amplifier circuit 217A includes a first power comparison circuit PD1 and a first amplifier circuit OP1. The first power comparison circuit PD1 is coupled to the first low-pass filter circuit LPF1 and the second low-pass filter circuit LPF2 for comparing the powers of the low frequency components of the equalizing signal VEQ and the slicing signal VS and outputs a differential signal to the first amplifier circuit OP1. The differential signal indicates a power difference between the two low frequency components. Then, the first amplifier circuit OP1 amplifies the differential signal to serve as the swing adjustment signal Vsw for adjusting the swing of the equalizer circuit 212 until the low frequency components of the equalizing signal VEQ and the slicing signal VS have equal powers. In another embodiment, the first amplifier circuit OP1 may further include a comparison circuit for executing the function of comparing the equalizing signal VEQ and the slicing signal VS in the first power comparison circuit PD1.

In this embodiment, the second detection circuit 216B includes a first high-pass filter circuit HPF1, a second high-pass filter circuit HPF2, and a second power amplifier circuit 217B. The first high-pass filter circuit HPF1 is coupled to the slicer circuit 214 and the equalizer circuit 212 for detecting the equalizing signal VEQ and outputs the high frequency component of the equalizing signal VEQ to the second power amplifier circuit 217B. The second high-pass filter circuit HPF2 is coupled to the slicer circuit 214 and the control circuit 222 for detecting the slicing signal VS and outputs the high frequency component of the slicing signal VS to the second power amplifier circuit 217B. The second power amplifier circuit 217B is coupled to the first high-pass filter circuit HPF1, the second high-pass filter circuit HPF2, and the equalizer circuit 212. The second power amplifier circuit 217B is used for comparing the high frequency components of the equalizing signal VEQ and the slicing signal VS and accordingly outputs the gain adjustment signal Vgn to adjust the gain of the equalizer circuit 212. The control circuit 222 is coupled to the first high-pass filter circuit HPF1 and the second high-pass filter circuit HPF2 and sends the setting signal Vset according to one preset state to set the DC bias in the first high-pass filter circuit HPF1 and the second high-pass filter circuit HPF2, so as to adjust outputs of the first high-pass filter circuit HPF1 and the second high-pass filter circuit HPF2.

In an embodiment, the second power amplifier circuit 217B includes a second power comparison circuit PD2 and a second amplifier circuit OP2. The second power comparison circuit PD2 is coupled to the first high-pass filter circuit HPF1 and the second high-pass filter circuit HPF2 for comparing the powers of the high frequency components of the equalizing signal VEQ and the slicing signal VS and outputs another differential signal to the second amplifier circuit OP2. The differential signal indicates a power difference between the two high frequency components. Next, the second amplifier circuit OP2 amplifies the differential signal to serve as the gain adjustment signal Vgn for adjusting the gain of the input signal VIN of the equalizer circuit 212 until the high frequency components of the equalizing signal VEQ and the slicing signal VS have equal powers. In another embodiment, the second amplifier circuit OP2 may further include a comparison circuit for executing the function of comparing the equalizing signal VEQ and the slicing signal VS in the second power comparison circuit PD2.

Figure 4:
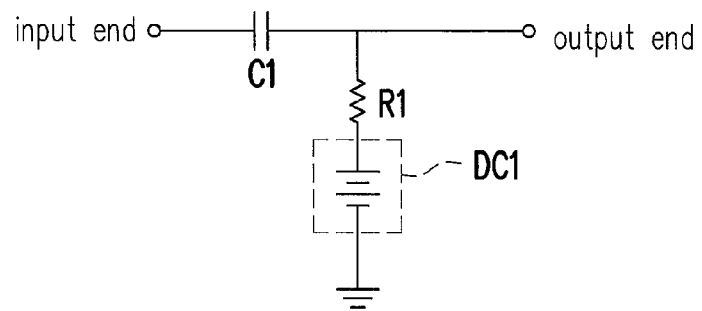
FIG. 4 is a diagram illustrating a high-pass filter circuit according to an embodiment of the invention.

FIG. 4 is a diagram illustrating a high-pass filter circuit according to an embodiment of the invention. Referring to FIG. 4, a high-pass filter circuit 400 of this embodiment includes a capacitor C1, a resistor R1, and a DC bias DC1. An end of the capacitor C1 serves as an input end of the high-pass filter circuit 400 and the other end thereof serves as an output end of the high-pass filter circuit 400. An end of the resistor R1 is coupled to the output end of the high-pass filter circuit 400 and the other end thereof is coupled to the DC bias DC1. The circuit structure of the capacitor C1 and the resistor R1 is used for filtering off the low frequency component of the signal inputted to the high-pass filter circuit 400. Moreover, the control circuit 222 sets the DC bias DC1 according to one selected preset state to adjust an output of the high-pass filter circuit 400, thereby changing an offset of the output. A circuit structure of the high-pass filter circuit 400 of this embodiment is, for example, a type of the first or the second high-pass filter circuit HPF1 and HPF2 of FIG. 3, but the invention is restricted thereto.

Figure 5:
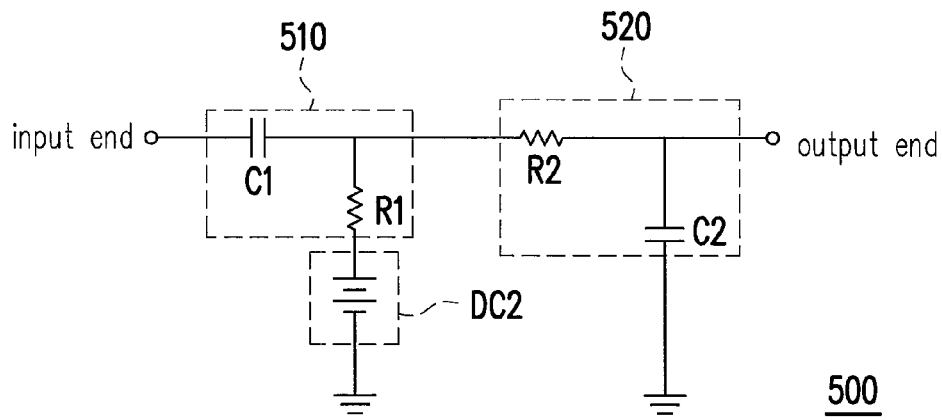
FIG. 5 is a diagram illustrating a low-pass filter circuit according to an embodiment of the invention.

FIG. 5 is a diagram illustrating a low-pass filter circuit according to an embodiment of the invention. Referring to FIG. 5, a low-pass filter circuit 500 of this embodiment includes a first low-pass filter unit 510, a second low-pass filter unit 520, and a DC bias DC2. The first low-pass filter unit 510 is a full band high-pass filter. The second low-pass filter unit 520 includes a resistor R2 and a capacitor C2. An end of the resistor R2 is coupled to one end of the capacitor C1 and the other end of the resistor R2 serves as an output end of the low-pass filter circuit 500. An end of the capacitor C2 is coupled to the output end of the low-pass filter circuit 500 and the other end of the capacitor C2 is coupled to a ground voltage. The circuit structure of the capacitor C2 and the resistor R2 is used for filtering off the high frequency component of the signal inputted to the low-pass filter circuit 500. Moreover, the control circuit 222 sets the DC bias DC2 according to one selected preset state to adjust an output of the low-pass filter circuit 500, thereby changing an offset of the output. A circuit structure of the low-pass filter circuit 500 of this embodiment is, for example, a type of the first or the second low-pass filter circuit LPF1 and LPF2 of FIG. 3, but the invention is restricted thereto.

It is worth mentioning that, in this embodiment, the DC biases DC1 and DC2 of the filters are set according to one selected preset state, and the filters with set DC biases are used to adjust the swing and gain of the equalizer circuit 212 for the equalizer circuit 212 to operate in one of the preset states. Therefore, besides storing a plurality of signal patterns in advance, the control circuit 222 may store a setting value corresponding to the DC biases DC1 and DC2 of each preset state as parameter information in a memory unit (not shown) in advance for changing the preset state of the equalizer circuit 212.

Figure 6:
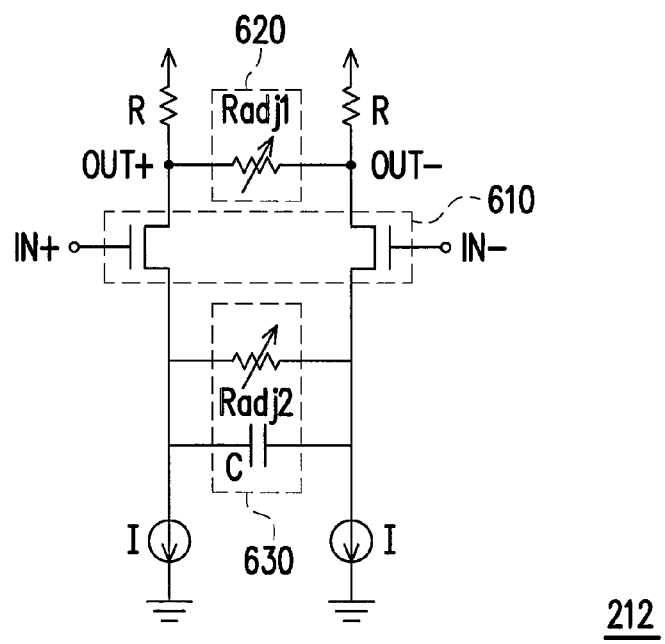
FIG. 6 is a detailed diagram illustrating an equalizer circuit in the transmission circuit of FIG. 2.

FIG. 6 is a detailed diagram illustrating an equalizer circuit in the transmission circuit of FIG. 2. Referring to FIG. 2 and FIG. 6, the equalizer circuit 212 of this embodiment includes a differential input pair 610, a swing adjustment device 620, a gain adjustment device 630, and a bias circuit. More specifically, the bias circuit includes a pair of bias resistors R and a pair of bias current sources I, but the invention is not limited thereto. In this embodiment, the differential input pair 610 has two input ends IN− and IN+ for receiving the input signal VIN with a differential form. The ends of the bias resistors R, which are coupled to the differential input pair 610, serve as two output ends OUT− and OUT+ of the equalizer circuit 212 for outputting the equalizing signal VEQ with a differential form.

In this embodiment, the signal detection circuit 216 adjusts the swing adjustment device 620 according to one selected preset state, so as to adjust the swing of the equalizer circuit 212. Likewise, the signal detection circuit 216 also adjusts the gain adjustment device 630 according to one selected preset state, so as to adjust the gain of the equalizer circuit 212. In other words, a transition function of the equalizer circuit 212 is adjusted through adjustment of the swing adjustment device 620 and the gain adjustment device 630, such that the equalizer circuit 212 performs the equalizing operation on the input signal VIN based on the adjusted transition function.

To be more specific, the swing adjustment device 620 of this embodiment includes a first variable resistor Radj1. In this embodiment, the signal detection circuit 216 adjusts the swing adjustment device 620, for example, by increasing a resistance of the first variable resistor Radj1 to increase the swing of the equalizer circuit 212, thereby increasing the swing of the slicing signal VS outputted by the equalizer circuit 212. In addition, the signal detection circuit 216 may decrease the resistance of the first variable resistor Radj1 to decrease the swing of the equalizer circuit 212, thereby decreasing the swing of the slicing signal VS outputted by the equalizer circuit 212. Furthermore, the gain adjustment device 630 of this embodiment includes a second variable resistor Radj2 and a capacitor C. In this embodiment, the signal detection circuit 216 adjusts the gain adjustment device 630, for example, by increasing a resistance of the second variable resistor Radj2 to decrease a high frequency gain of the equalizer circuit 212, thereby decreasing the gain of the high frequency component of the slicing signal VS. In addition, the signal detection circuit 216 may decrease the resistance of the second variable resistor Radj2 to increase the high frequency gain of the equalizer circuit 212, thereby increasing the gain of the high frequency component of the slicing signal VS.

Figure 7:
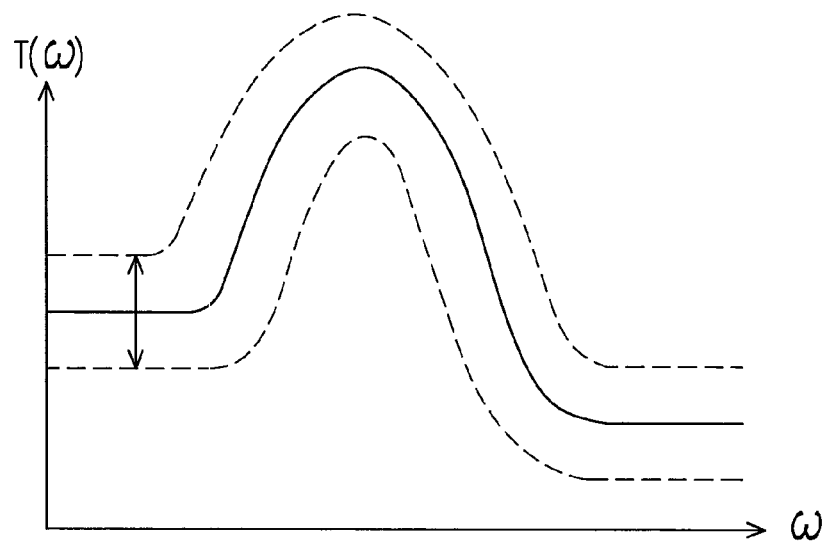
FIG. 7 illustrates a variation of a transition function of an input signal when a first variable resistor Radj1 is adjusted.
Figure 8:
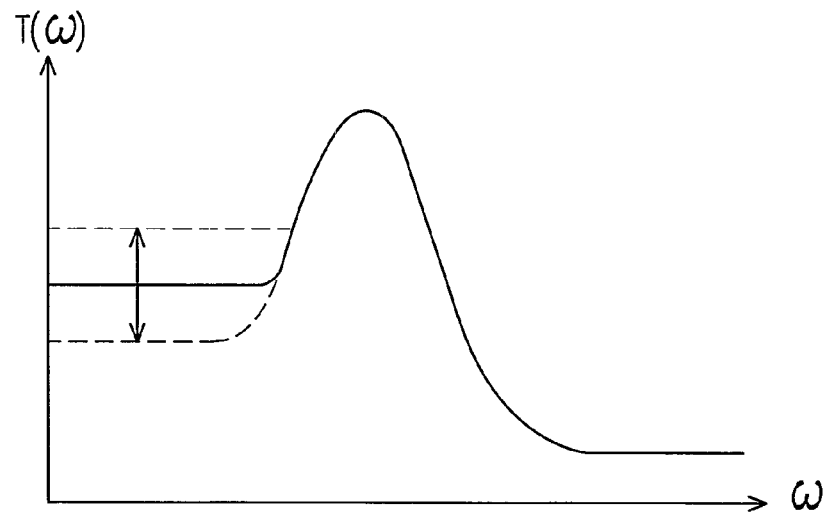
FIG. 8 illustrates a variation of a transition function of an input signal when a second variable resistor Radj2 is adjusted.

FIG. 7 illustrates a variation of the transition function of the equalizer circuit 212 when the first variable resistor Radj1 is adjusted. FIG. 8 illustrates a variation of the transition function of equalizer circuit 212 when the second variable resistor Radj2 is adjusted. First, with reference to FIG. 7, as described above, the signal detection circuit 216 may increase or decrease the resistance of the first variable resistor Radj1 to correspondingly increase or decrease the swing of the equalizer circuit 212. This characteristic is reflected by a transition function $T(\omega)$ of the equalizer circuit 212, as shown in FIG. 7. When the resistance of the first variable resistor Radj1 increases, the entirety of the transition function $T(\omega)$ increases linearly, as illustrated by the upper dotted line in FIG. 7. On the other hand, when the resistance of the first variable resistor Radj1 decreases, the entirety of the transition function $T(\omega)$ decreases linearly, as illustrated by the lower dotted line in FIG. 7. With reference to FIG. 8, as described above, the signal detection circuit 216 may increase or decrease the resistance of the second variable resistor Radj2 to correspondingly decrease or increase the high frequency gain of the equalizer circuit 212. This characteristic is reflected by the transition function $T(\omega)$ of the equalizer circuit 212, as shown in FIG. 8. Given that the high frequency component of the transition function $T(\omega)$ remains unchanged, when the resistance of the second variable resistor Radj2 increases, the low frequency component of the transition function $T(\omega)$ linearly increases with the resistance, as illustrated by the upper dotted line in FIG. 8. On the other hand, when the resistance of the second variable resistor Radj2 decreases, the low frequency component of the transition function $T(\omega)$ decreases linearly as the resistance increases, as illustrated by the lower dotted line in FIG. 8. To see the low frequency variation from another aspect, given that the low frequency component of the transition function $T(\omega)$ remains unchanged and the resistance of the second variable resistor Radj2 changes, the high frequency component of the transition function $T(\omega)$ linearly decreases as the resistance increases, or the high frequency component of the transition function $T(\omega)$ linearly increases as the resistance decreases.

Figure 9:
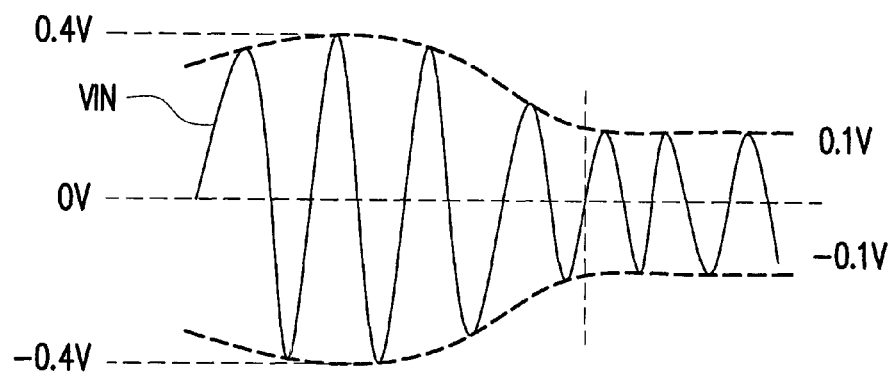
FIG. 9 illustrates a waveform of an input signal.
Figure 10:
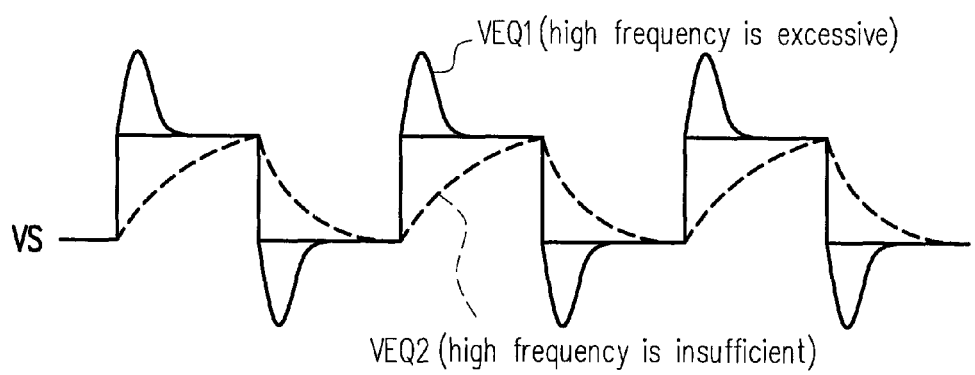
FIG. 10 illustrates waveforms of an equalizing signal and a slicing signal.

Based on the aforementioned adjustments of the variable resistors, a relationship between the variations of waveforms of the input signal VIN, the equalizing signal VEQ, and the slicing signal VS are explained below. FIG. 9 illustrates the waveform of the input signal. FIG. 10 illustrates the waveforms of the equalizing signal and the slicing signal. First, referring to FIG. 9, the swing of the low frequency component of the input signal VIN inputted to the equalizer circuit 212 in this embodiment is between ±0.4 Volt, and the high frequency component of the input signal VIN is between ±0.1 Volt, for example. In an embodiment, the input signal VIN may be transmitted from the host 10 of FIG. 1 to the transmission circuit 100 via the transmission channel 30. During the transmission, the high frequency component of the input signal VIN deteriorates more than the low frequency component. Thus, the swing of the high frequency component is less than the swing of the low frequency component. After the equalizer circuit 212 performs the equalizing operation on the input signal VIN of FIG. 9 with specific gain and swing, the equalizing signal VEQ is obtained, e.g. an equalizing signal VEQ1 or VEQ2 shown in FIG. 10. After the equalizing signal VEQ passes through the slicer circuit 214, the slicer circuit 214 outputs the slicing signal VS, e.g. the slicing signal VS shown in FIG. 10.

In an embodiment, when the equalizer circuit 212 performs the equalizing operation, the control circuit 222 uses the swing adjustment signal Vsw to adjust the resistance of the first variable resistor Radj1, such that the equalizing signal VEQ outputted by the equalizer circuit 212 has the same swing. The equalizing signal VEQ with adjusted swing, e.g. the equalizing signals VEQ1 and VEQ2 of FIG. 10, are obtained without gain adjustment.

Next, it is assumed that the equalizing signal VEQ still has excessive or insufficient high frequency component after the swing of the equalizing signal VEQ is adjusted according to the actual design requirement. In FIG. 10, the equalizing signal VEQ1 and the equalizing signal VEQ2 respectively illustrate the situations of equalizing operations with excessive and insufficient high frequency components. Compared with the ideal slicing signal VS in FIG. 10, the equalizing signals VEQ1 and VEQ2 with excessive and insufficient high frequency components still cannot meet the actual design requirement after the slicing process. Thus, the high frequency components of the equalizing signals VEQ1 and VEQ2 may be adjusted to obtain the equalizing signal VEQ with an ideal high frequency component. In this embodiment, the control circuit 222 uses the gain adjustment signal Vgn to increase or decrease the resistance of the second variable resistor Radj2, so as to correspondingly decrease or increase the high frequency gain of the equalizer circuit 212, thereby decreasing the high frequency component of the equalizing signal VEQ1 or increasing the low frequency component of the equalizing signal VEQ1 to obtain the slicing signal VS that meets the actual design requirement.

Although this embodiment discloses that the signal swing is adjusted before the signal gain is adjusted, the invention is not restricted thereto. In another embodiment, the signal gain may be adjusted before the signal swing is adjusted. Moreover, although this embodiment discloses that the first variable resistor Radj1 and the second variable resistor Radj2 are respectively adjusted to change the swing and the high frequency component of the equalizing signal VEQ, the invention is not restricted thereto. In another embodiment, the second variable resistor Radj2 and the first variable resistor Radj1 may be respectively adjusted to change the swing and the high frequency component of the equalizing signal VEQ.

Figure 11:
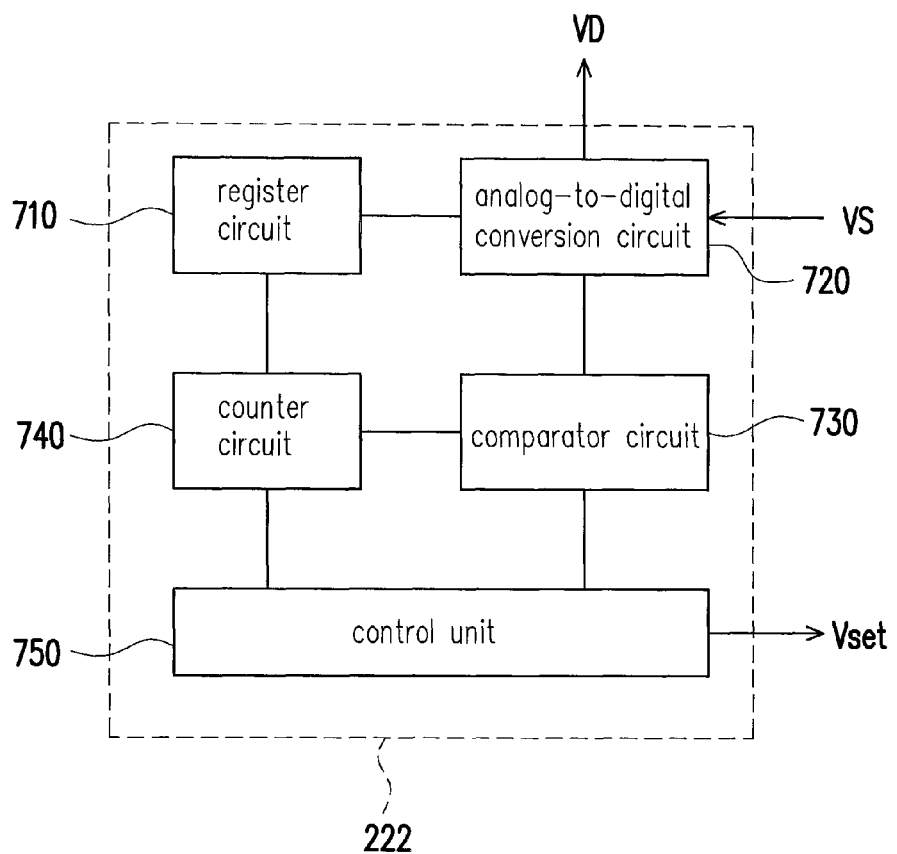
FIG. 11 is a block diagram illustrating a control circuit in the transmission circuit of FIG. 2.

FIG. 11 is a block diagram illustrating a control circuit in the transmission circuit of FIG. 2. Referring to FIG. 2 and FIG. 11, the control circuit 222 of this embodiment includes a register circuit 710, an analog-to-digital conversion circuit 720, a comparator circuit 730, a counter circuit 740, and a control unit 750. The register circuit 710 is used for storing the parameter information of each preset state and a plurality of ideal signal patterns in advance. The analog-to-digital conversion circuit 720 is used for performing an analog-to-digital conversion operation on the slicing signal VS and outputting a corresponding digital signal VD to a circuit of the next stage. The comparator circuit 730 is coupled to the analog-to-digital conversion circuit 720 and used for comparing the slicing signal VS with the ideal signal patterns to output a comparison result. In an embodiment, the signal patterns are digital information, for example. Therefore, the slicing signal VS received by the comparator circuit 730 is a signal after analog-to-digital conversion, for example. The counter circuit 740 is coupled to the comparator circuit 730 for counting matching times of the slicing signal VS and the signal patterns to output a counting result accordingly. In this embodiment, an index for evaluating a matching degree of the slicing signal VS and the signal patterns of each preset state is a bit error rate or a correct rate, for example. The control unit 750 is coupled to the counter circuit 740 for selecting the parameter information with the lowest bit error rate or the highest correct rate according to the counting result for the equalizer circuit 212 to operate in the preset state that corresponds to the selected parameter information.

It is noted that, in an embodiment that does not include the counter circuit 740, the control unit 750 directly selects one of the preset states as the preset state according to the comparison result of the comparator circuit 730, for example. In an embodiment that includes the counter circuit 740, the control unit 750 selects one of the preset states as the preset state according to the counting result of the counter circuit 740 in a specific time period, for example. The specific time period is 4 milliseconds (ms), for example, in the RxEQ step defined by the USB 3.0 standard.

Figure 12:
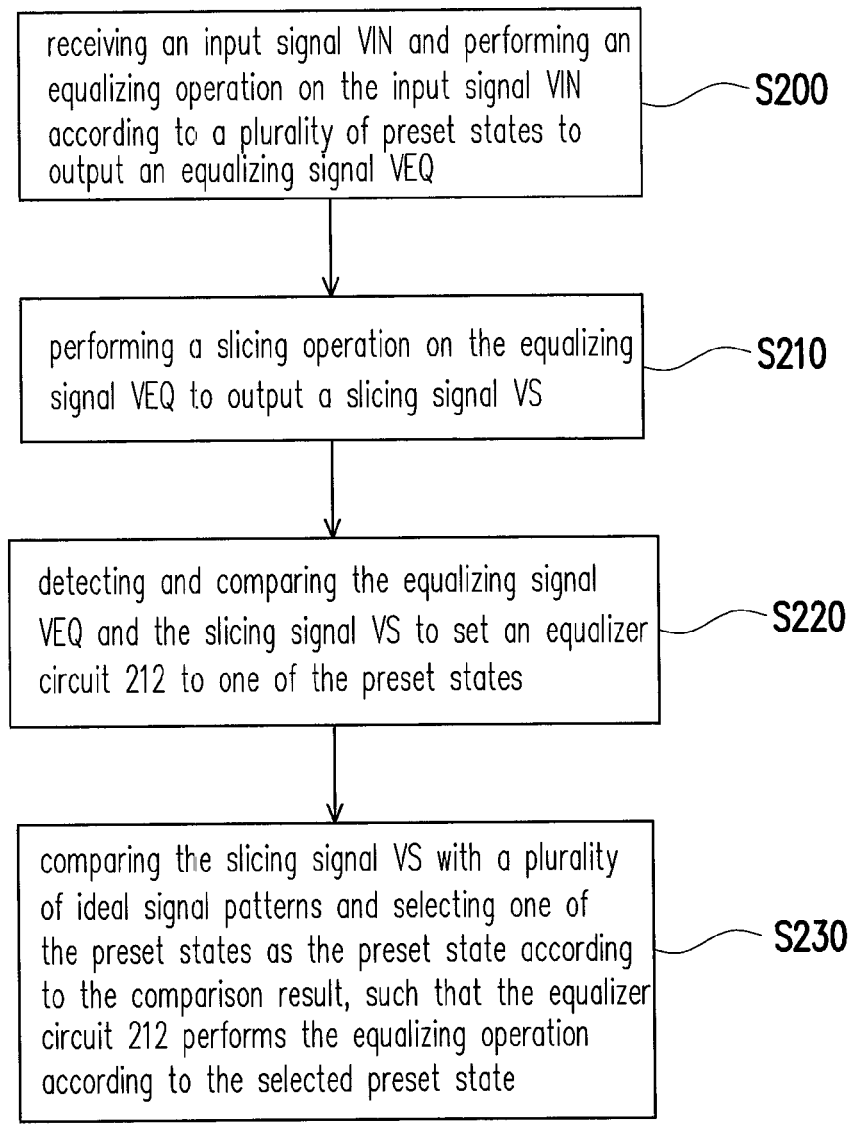
FIG. 12 is a flowchart showing a signal transmission method according to an embodiment of the invention.

FIG. 12 is a flowchart showing a signal transmission method according to an embodiment of the invention. Referring to FIG. 12, the signal transmission method of this embodiment is for example adapted for the transmission circuit disclosed in the above embodiments. The signal transmission method includes the following steps. In Step S200, the equalizer circuit 212 receives the input signal VIN and performs the equalizing operation on the input signal VIN respectively according to a plurality of preset states to output the equalizing signal VEQ corresponding to each preset state. Then, in Step S210, the slicer circuit 214 performs the slicing operation on the equalizing signal VEQ to output the slicing signal VS. Next, in Step S220, the signal detection circuit 216 detects and compares the equalizing signal VEQ and the slicing signal VS and accordingly adjusts the equalizer circuit 212 to one of the preset states. Thereafter, in Step S230, the control circuit 222 compares the slicing signal VS with a plurality of ideal signal patterns and selects one of the preset states as the preset state according to the comparison result, such that the equalizer circuit 212 performs the equalizing operation according to the selected preset state.

Descriptions of the embodiments of FIG. 1 to FIG. 12 provide enough teaching, suggestion, and illustration for implementation. Thus, the signal transmission method of this embodiment of the invention is not explained in detail below.

According to the disclosure, the control circuit 222 uses a first preset state among a plurality of preset states to set the DC biases DC1 and DC2 of the filter of the signal detection circuit 216. Then, the signal detection circuit 216 compares the signal powers of the high and low frequency components of the equalizing signal VEQ and the slicing signal VS and respectively outputs the differential signals corresponding to the high and low frequency components to the amplifier circuit therein, which represent the power differences of the equalizing signal VEQ and the slicing signal VS. Next, the amplifier circuit amplifies the differential signal to adjust the swing adjustment device 620 and the gain adjustment device 630 in the equalizer circuit 212 until the power of the equalizing signal VEQ and the power of the slicing signal VS become equal. Following that, the control circuit 222 calculates the bit error rate or the correct rate of the slicing signal VS and the ideal signal patterns.

Thereafter, the control circuit 222 repeats the aforementioned procedure with a second preset state of the preset states. After the procedure is executed for all the preset states, the control circuit 222 selects the preset state with the lowest bit error rate or the preset state with the highest correct rate as the parameter setting for the equalizer circuit 212 to perform the equalizing operation.

To conclude the above, in the exemplary embodiments of the invention, the control circuit sets the preset state for the equalizer circuit to perform the equalizing operation based on the comparison result of the slicing signal and the signal patterns. Accordingly, the preset state that is most suitable for the quality of the current transmission channel is selected from a plurality of preset states.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A transmission circuit adapted for an input and output (I/O) interface, the transmission circuit comprising:
    an equalizer circuit receiving an input signal and performing an equalizing operation on the input signal according to a plurality of preset state values to output an equalizing signal corresponding to each preset state value;
    a slicer circuit coupled to the equalizer circuit, receiving the equalizing signal, and performing a slicing operation on the equalizing signal to output a slicing signal;
    a signal detection circuit coupled to the slicer circuit, and detecting and comparing the equalizing signal and the slicing signal to adjust the equalizer circuit to one of the preset state values; and
    a control circuit coupled to the slicer circuit for receiving the slicing signal corresponding to each preset state value, comparing the slicing signal corresponding to each preset state value with a plurality of signal patterns to generate a comparison result, and selecting one of the preset state values according to the comparison result to let the equalizer circuit perform the equalizing operation according to the selected preset state value.

2. The transmission circuit according to claim 1, wherein the equalizer circuit performs the equalizing operation according to the selected preset state value via the signal detection circuit.

3. The transmission circuit according to claim 1, wherein the control circuit comprises:
    a register circuit storing parameter information of each preset state value and the signal patterns.

4. The transmission circuit according to claim 1, wherein the control circuit comprises:
    an analog-to-digital conversion circuit performing an analog-to-digital conversion operation on the slicing signal and outputting a corresponding digital signal to a circuit of a next stage.

5. The transmission circuit according to claim 1, wherein the control circuit comprises:
    a comparator circuit coupled to the slicer circuit and comparing the slicing signal corresponding to each preset state value with the signal patterns to output the comparison result;
    a counter circuit counting matching times of the slicing signal and the signal patterns to output a counting result; and
    a control unit coupled to the counter circuit and selecting one of the preset state values according to the counting result.

6. The transmission circuit according to claim 1, wherein the equalizer circuit comprises:
    a swing adjustment device, wherein the signal detection circuit adjusts the swing adjustment device according to one of the preset state values to adjust a swing of the equalizer circuit.

7. The transmission circuit according to claim 6, wherein the swing adjustment device comprises a first variable resistor, and the signal detection circuit increases a resistance of the first variable resistor to increase the swing of the equalizer circuit and decreases the resistance of the first variable resistor to decrease the swing of the equalizer circuit.

8. The transmission circuit according to claim 1, wherein the equalizer circuit comprises:
    a gain adjustment device, wherein the signal detection circuit adjusts the gain adjustment device according to one of the preset state values to adjust a gain of the equalizer circuit.

9. The transmission circuit according to claim 8, wherein the gain adjustment device comprises a second variable resistor, and the signal detection circuit increases a resistance of the second variable resistor to decrease a high frequency gain of the equalizer circuit and decreases the resistance of the second variable resistor to increase the high frequency gain of the equalizer circuit.

10. The transmission circuit according to claim 1, wherein the signal detection circuit comprises:
    a first detection circuit coupled to the slicer circuit for detecting and comparing low frequency component of the equalizing signal and low frequency component of the slicing signal to output a swing adjustment signal to adjust a swing of the equalizer circuit.

11. The transmission circuit according to claim 10, wherein the first detection circuit comprises:
    a first low-pass filter circuit coupled to the slicer circuit and the equalizer circuit for detecting the equalizing signal and outputting the low frequency component of the equalizing signal;
    a second low-pass filter circuit coupled to the slicer circuit and the control circuit for detecting the slicing signal and outputting the low frequency component of the slicing signal; and
    a first power amplifier circuit coupled to the first low-pass filter circuit and the second low-pass filter circuit for comparing and amplifying powers of the low frequency components of the equalizing signal and the slicing signal to output the swing adjustment signal to adjust the swing of the equalizer circuit,
    wherein the control circuit adjusts outputs of the first and the second low-pass filter circuits by adjusting DC biases in the first and the second low-pass filter circuits.

12. The transmission circuit according to claim 1, wherein the signal detection circuit comprises:
    a second detection circuit coupled to the slicer circuit for detecting and comparing high frequency component of the equalizing signal and high frequency component of the slicing signal to output a gain adjustment signal to adjust a gain of the equalizer circuit.

13. The transmission circuit according to claim 12, wherein the second detection circuit comprises:
   a first high-pass filter circuit coupled to the slicer circuit and the equalizer circuit for detecting the equalizing signal and outputting the high frequency component of the equalizing signal;
   a second high-pass filter circuit coupled to the slicer circuit and the control circuit for detecting the equalizing signal and outputting the high frequency component of the slicing signal; and
   a second power amplifier circuit coupled to the first high-pass filter circuit and the second high-pass filter circuit for comparing and amplifying powers of the high frequency components of the equalizing signal and the slicing signal to output the gain adjustment signal to adjust the gain of the equalizer circuit,
   wherein the control circuit adjusts outputs of the first and the second high-pass filter circuits by adjusting DC biases in the first and the second high-pass filter circuits.

14. A signal transmission method adapted for a transmission circuit of an input and output (I/O) interface, the signal transmission method comprising:
   receiving an input signal and performing an equalizing operation on the input signal according to a plurality of preset state values to output an equalizing signal corresponding to each preset state value;
   performing a slicing operation on the equalizing signal to output a slicing signal;
   detecting and comparing the equalizing signal and the slicing signal to set the transmission circuit to one of the preset state values; and
   comparing the slicing signal corresponding to each preset state value with a plurality of signal patterns to generate a comparison result and selecting one of the preset state values according to the comparison result to let the transmission circuit perform the equalizing operation according to the selected preset state value.

15. The signal transmission method according to claim 14, further comprising:
   storing parameter information of each preset state value and the signal patterns; and counting matching times of the slicing signal corresponding to each preset state value and the signal patterns to output a counting result;
   wherein one of the preset state values is selected according to the counting result in a step of selecting one of the preset state values.

16. The signal transmission method according to claim 14, wherein the transmission circuit comprises an equalizer circuit, and the step of performing the equalizing operation on the input signal comprises:
   adjusting a swing or a gain of the equalizer circuit according to one of the preset state values.

17. The signal transmission method according to claim 16, wherein the step of detecting and comparing the equalizing signal and the slicing signal comprises:
   detecting, comparing, and amplifying powers of low frequency component of the equalizing signal and low frequency component of the slicing signal to output a swing adjustment signal to adjust the swing of the equalizer circuit.

18. The signal transmission method according to claim 16, wherein the step of detecting and comparing the equalizing signal and the slicing signal comprises:
   detecting, comparing, and amplifying powers of high frequency component of the equalizing signal and high frequency component of the slicing signal to output a gain adjustment signal to adjust the gain of the equalizer circuit.

19. The signal transmission method according to claim 16, wherein the equalizer circuit comprises a first variable resistor and a second variable resistor, and the step of detecting and comparing the equalizing signal and the slicing signal further comprises:
   increasing a resistance of the first variable resistor to increase the swing of the equalizer circuit, or decreasing the resistance of the first variable resistor to decrease the swing of the equalizer circuit; and
   increasing a resistance of the second variable resistor to decrease the high frequency gain of the equalizer circuit, or decreasing the resistance of the first variable resistor to increase the high frequency gain of the equalizer circuit.

20. A transmission circuit adapted for an input and output (I/O) interface, establishing a communication link with a host via a transmission channel, the transmission circuit comprising:
   an analog circuit block receiving an input signal, performing an equalizing operation on the input signal according to a plurality of preset state values, to output an equalizing signal corresponding to each preset state value, and performing a slicing operation on the equalizing signal to output a slicing signal; and
   a digital circuit block coupled to the analog circuit block for receiving the slicing signal corresponding to each preset state value, comparing the slicing signal corresponding to each preset state value with a plurality of signal patterns to generate a comparison result, and selecting one of the preset state values according to the comparison result to let the analog circuit block perform the equalizing operation according to the selected preset state value,
   wherein the analog circuit block further comprises:
   a signal detection circuit detecting and comparing the equalizing signal and the slicing signal, so as to adjust one of the preset state values to perform the equalizing operation.

21. A transmission circuit according to claim 20, wherein the digital circuit block further performs the equalizing operation according to one of the preset state values selected via the signal detection circuit.

* * * * *